No. 669,092. Patented Mar. 5, 1901.
H. H. MARTIN.
DENTAL REGULATOR AND SPACER.
(Application filed Oct. 20, 1900.)
(No Model.)

WITNESSES
INVENTOR
Hugh H. Martin

THE NORRIS PETERS CO., PHOTO-LITHO., WASHINGTON, D. C.

United States Patent Office.

HUGH H. MARTIN, OF PEORIA, ILLINOIS.

DENTAL REGULATOR AND SPACER.

SPECIFICATION forming part of Letters Patent No. 669,092, dated March 5, 1901.

Application filed October 20, 1900. Serial No. 33,793. (No model.)

*To all whom it may concern:*

Be it known that I, HUGH H. MARTIN, a citizen of the United States of America, residing at Peoria, in the county of Peoria and State of Illinois, have invented certain new and useful Improvements in Dental Regulators and Spacers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to certain new and useful improvements for the separation of teeth during the operation of filling the same and other dental operations.

To this end my invention consists of a heart-shaped concavo-convex frame having on its interior circumference a wedge-shaped projection to be placed on the lineal surface of the teeth and inside of the mouth, with the apex resting in the interstice of the teeth to be separated, and also a movable wedge operated by an exterior or male screw attached thereto, working in a fixed interior or female screw through such frame directly opposite of such wedge-shaped projection in lateral guides passing through the frame from the labial surface of the teeth to be separated and in the same interstice. The teeth between which these wedges are inserted are gradually forced apart as the movable wedge is made to approach the fixed wedge projection by turning the screw, which moves the former.

Figure 1:
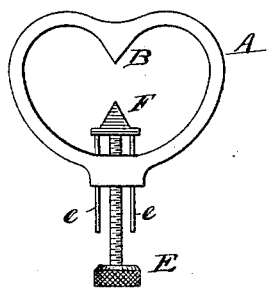
Figure 2:
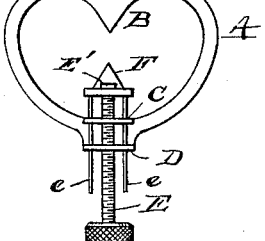
Figure 3:
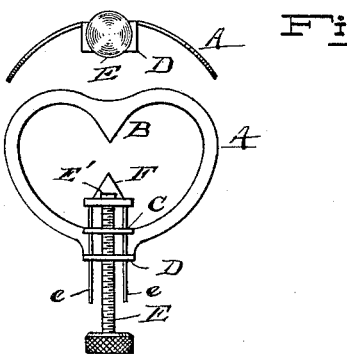
Figure 4:
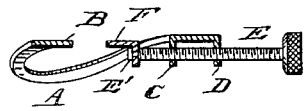
Figure 5:
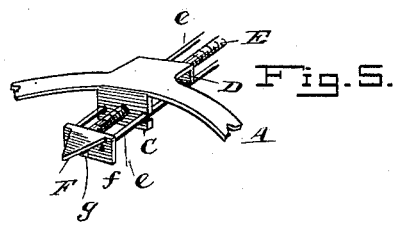
Figure 6:
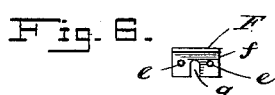
Figure 7:
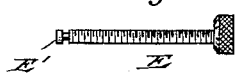

In the accompanying drawings, which illustrate my invention, Figures 1 and 3 are perspective views, the former representing the convex and the latter the concave side. Fig. 2 represents an end view showing the head of the screw and part of the frame. Fig. 4 represents a longitudinal sectional view of the screw and frame. Fig. 5 represents the part of the frame through which the screw and guides pass, with wedge and parts of the screw and guides. Fig. 6 represents a posterior view of the movable wedge and the holes for the guides and slot for the screw. Fig. 7 shows the screw.

A refers to the heart-shaped frame, which is constructed, preferably, of metal, having the wedge-shaped projection B on the inner circumference.

F represents the movable wedge, operated by means of the screw E, passing through the plates C and D, each perforated by an interior or female screw.

E represents the end of the screw, showing a groove or bay to fit in the slot *g*, so as to fasten the screw E firmly to the wedge F, the plate *f* being formed by bending the same sheet of metal that forms the wedge, as shown in the drawings.

The letters *e e* represent guide-rods to hold the wedge in a fixed position and pass freely through the plates D and C and are fastened to the plate *f*.

The advantage of the device for which I am seeking to obtain a patent over every other of which I have any knowledge is that by reason of its shape and construction it is less in the way of the operator and is more simple and more effective in its operation.

I claim—

The heart-shaped concavo-convex frame A with the wedge-shaped projection B on its inner circumference in combination with the movable wedge F, the screw E and the plates C and D having interior screws and the guide-rods *e e*, constructed and operated in the manner and for the purpose substantially as above set forth.

In testimony whereof I affix my signature in the presence of two witnesses.

HUGH H. MARTIN.

Witnesses:
  CHARLES C. GREENE,
  ROBERT M. CONKEY.